United States Patent
Krenn et al.

(10) Patent No.: US 7,096,106 B2
(45) Date of Patent: Aug. 22, 2006

(54) METHOD AND SYSTEM FOR THE REGULATION AND/OR CONTROL OF AN ENGINE GEARBOX UNIT IN A MOTOR VEHICLE

(75) Inventors: Helmut Krenn, Unterfoehring (DE); Lothar Wolf, Holzkirchen (DE); Hubert Schumacher, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/089,509

(22) Filed: Mar. 25, 2005

(65) Prior Publication Data
US 2005/0222745 A1    Oct. 6, 2005

Related U.S. Application Data

(63) Continuation of application No. PCT/EP03/10419, filed on Sep. 18, 2003.

(30) Foreign Application Priority Data
Sep. 25, 2002  (DE) ............... 102 44 519

(51) Int. Cl.
*G06F 7/00* (2006.01)
*G06F 17/00* (2006.01)

(52) U.S. Cl. .................. 701/54; 701/51; 701/52; 477/107; 477/110

(58) Field of Classification Search .............. 701/51, 701/52, 53, 54, 57; 477/109, 110, 107, 102, 477/33, 93, 98, 155
See application file for complete search history.

(56) References Cited

U.S. PATENT DOCUMENTS

| | | | |
|---|---|---|---|
| 5,163,530 A | 11/1992 | Nakamura et al. | |
| 6,128,564 A * | 10/2000 | Graf | 701/51 |
| 6,151,542 A | 11/2000 | Yoshino et al. | |
| 6,188,945 B1 | 2/2001 | Graf et al. | |
| 6,339,739 B1 | 1/2002 | Folke et al. | |
| 6,360,154 B1 | 3/2002 | Krenn et al. | |
| 6,466,851 B1 | 10/2002 | Kato et al. | |
| 6,497,636 B1 | 12/2002 | Schleicher et al. | |
| 2001/0004619 A1 | 6/2001 | Schleicher et al. | |
| 2001/0039230 A1* | 11/2001 | Severinsky et al. | 477/3 |

(Continued)

FOREIGN PATENT DOCUMENTS

DE    196 37 210    3/1998

(Continued)

*Primary Examiner*—Gertrude A. Jeanglaude
(74) *Attorney, Agent, or Firm*—Crowell & Moring LLP

(57) ABSTRACT

A method for regulating and/or controlling an engine-transmission unit in a motor vehicle includes prioritizing torque demands to obtain an only torque value, storing the only torque value as a current successful situation and retaining the torque value for the previous successful situation, and processing the torque value of the current successful situation as well as the torque value of the previous successful situation to comparable torque values in each case required for the implementation of the demands. The method farther includes changing a desired torque demand at driving wheels of the motor vehicle from the torque value of the previous successful situation to the torque value of the current successful situation in the event of a priority change when the current successful situation is different from the previous successful situation, sending the desired torque demand to an electronic controller, and carrying out the desired torque demand by controlling at least one of engine parameters and a ratio of a transmission unit.

17 Claims, 4 Drawing Sheets

U.S. PATENT DOCUMENTS

2001/0056320 A1    12/2001  Kato et al.
2004/0204286 A1*   10/2004  Stridsberg ................... 477/14

FOREIGN PATENT DOCUMENTS

| | | |
|---|---|---|
| DE | 196 48 055 | 6/1998 |
| DE | 199 40 703 | 5/2001 |
| DE | 199 61 312 | 6/2001 |
| DE | 199 62 963 | 6/2001 |
| DE | 101 29 930 | 1/2002 |
| DE | 100 64 822 | 6/2002 |
| WO | WO 02/02366 | 1/2002 |

* cited by examiner

METHOD AND SYSTEM FOR THE REGULATION AND/OR CONTROL OF AN ENGINE GEARBOX UNIT IN A MOTOR VEHICLE

CROSS REFERENCE TO RELATED APPLICATIONS

This application is a continuation of International Patent Application No. PCT/EP2003/010419, filed Sep. 18, 2003, designating the United States of America, and published in German as WO 2004/030974 A1, the entire disclosure of which is incorporated herein by reference. Priority is claimed based on German Patent Application No. 102 44 519.2, filed Sep. 25, 2002.

BACKGROUND AND SUMMARY OF THE INVENTION

The present invention relates to a method and a system for controlling and/or regulating an engine transmission unit in a motor vehicle.

Methods and systems are provided in motor vehicles for converting a concrete torque demand at driving wheels of the motor vehicle by regulating desired values at an internal-combustion engine and/or a transmission ratio. As a rule, they therefore intervene at two points in an engine transmission unit for imaging a rotational-speed and torque range of an internal-combustion engine in a certain manner on the rotational-speed and torque range at the driving wheels of the motor vehicle corresponding to a given demand. In this case, among others, characteristic rotational speed—torque curves of the participating units should be taken into account separately.

According to the state of the art, a torque demand is defined by a respective driver of the motor vehicle, as a rule, by the position of an accelerator pedal or another input device. Various suggestions with respect to solutions are known from the field of automatic transmissions for motor vehicles with internal-combustion engines for the concrete conversion of such a torque demand. For example, in German Patent Document DE 199 49 703 C1, a method and a corresponding system are described for the continuous adjustment of each desired wheel torque in the case of an automatic range transmission. In German Patent Document DE 199 61 312 C1, an engine torque—rotational speed pair is determined as an operating point from a stored characteristic curve diagram for an infinitely variable automatic transmission depending on the driving situation and on the driver's intention. This operating point is taken as a point of intersection of the characteristic curve with a power demand hyperbola for this engine while talking into account losses determined by means of models. As relative criteria for the determination or selection of an engine operating point as the torque—rotational speed pair, the environmental and driving situation as well as the drivability, the engine-side overall efficiency, the acoustics and the driving characteristic may be entered. However, in this case, only one definition is converted by the driver as a demand, as in the case of all other methods and systems according to the state of the art, irrespective of the form of a respective transmission and of the type of the driving engine, in addition to the demand by the driver himself, for each possible torque demand of at least one external system, in an electronic control unit, a separate interface is provided at which the torque demand to be converted arrives. In the control device, at a corresponding point in the torque structure, depending on the type and dynamics of the demand, subsequently a decision is made by a minimal or maximal selection as to which of the demanded torques is converted. The transition from one demand to another, for example, when one of the demands is added or eliminated, takes place by way of a filter which defines certain transition gradients. Without transition gradients, the transition takes place according to defined torque buildup or torque reduction criteria which are fixedly defined in the control and/or regulation of the internal-combustion engine.

The disadvantages of this implementation essentially consist of the fact that a separate interface has to be provided in the control and/or regulation for each torque demand, and a prioritization, thus the determination as to which of the demands is finally adjusted or implemented, is fixedly coded by the maximal or minimal selection at different levels. Furthermore, the transition between different demands is implemented within the limits and definitions of a fixedly coded regulator. As a result of the increasing complexity of the overall systems in modern motor vehicles, the development expenditures of the above-described systems reach the limits of what can be mastered if there are additional expansions and/or adaptations to existing implementations. High balancing expenditures are required here in order to coordinate, when a new interface is added, its demands with those of already existing demanders and a reliable operation of the internal-combustion engine in one system.

It is therefore an object of the present invention to create a method and a system which, at acceptable costs, can be flexibly and reliably expanded and adapted to an adjustable number of demanders.

According to the invention, this object is achieved by a method or a system, which are described and claimed hereinafter.

Accordingly, in a method according to the invention, a calculation of a torque definition to be converted in each case from a defined number of demanders, which torque definition is directed at an electronic control of a driving machine and/or a transmission unit, is implemented in a separate function unit which is connected to the control. This method permits the evaluating of many different torque demands to be implemented to the control unit of a drive assembly or of an engine transmission unit according to physical and empirical aspects and then sending a torque demand to the electronic drive control unit. Thus, only one interface has to be defined in the control of the drive assembly for the torque to be set by the drive assembly, and has to be correspondingly coordinated. This coordination has to meet the dynamic requirements of the individual torque demands. The entire coordination of external torque demands takes place in the higher-ranking function unit (the master) and is therefore finally implemented by way of a single demand in the engine transmission unit or the drive assembly. All known regulating and adjusting methods and corresponding systems for the different drive assemblies can be seamlessly connected here, partly with the simplification that only one demand has to be converted. In this case, all types and models of engines/motors and transmission units can be used, such as internal-combustion, hydraulic or pneumatic drives as well as accumulator-fed electric motors or hybrid drives. In addition to automatic CVT or BIT transmissions, range transmissions can also be used as transmission units.

In a preferred embodiment of the invention, the implementation of such a master as a higher-ranking function unit takes place in three steps. First, in addition to internal torque demands, external torque demands, which are the result of different environmental and driving conditions, are considered. Then the external and internal torque demands are processed into wheel torques. Finally, the demands are prioritized, and a torque demand or torque definition is output to the electronic control of the driving machine and/or transmission unit.

In an advantageous embodiment according to the invention, a differentiation is made between the occurrence of a priority change and a progression of the respective regulating process without a priority change. In the case of a priority change, a special method is used for implementing the transition which will be explained in the following in the description by way of an example on an embodiment with reference to the drawings. Preferably, in the event of a priority change, a continuous transition is selected in the torque definition, which is determined as a function of an available time and the difference of the level of the new and of the old definition torque. In an embodiment, in a matrix for the output of the time applicable to a transition of priority demand and/or a respective curve shape are provided.

On the whole, for implementing a method according to one or more of the above-listed characteristics, a system is created in which a number of demanders can be flexibly and reliably expanded and can also be adapted with respect to their options. As a result of the definition of adapted transition functions, as a further development of the invention, in the event of a priority transition, a continuous adaptation of a torque definition takes place which is adapted to the physical characteristics of the subsequent electromechanical total system. Advantageously, on the whole, a simplification of a total control is achieved independently of the type of the engine-transmission unit and the number of torque demanders.

For illustrating additional advantages, an embodiment of the invention is described as an example in the following by means of the drawings.

DETAILED DESCRIPTION OF THE DRAWINGS

Figure 1:
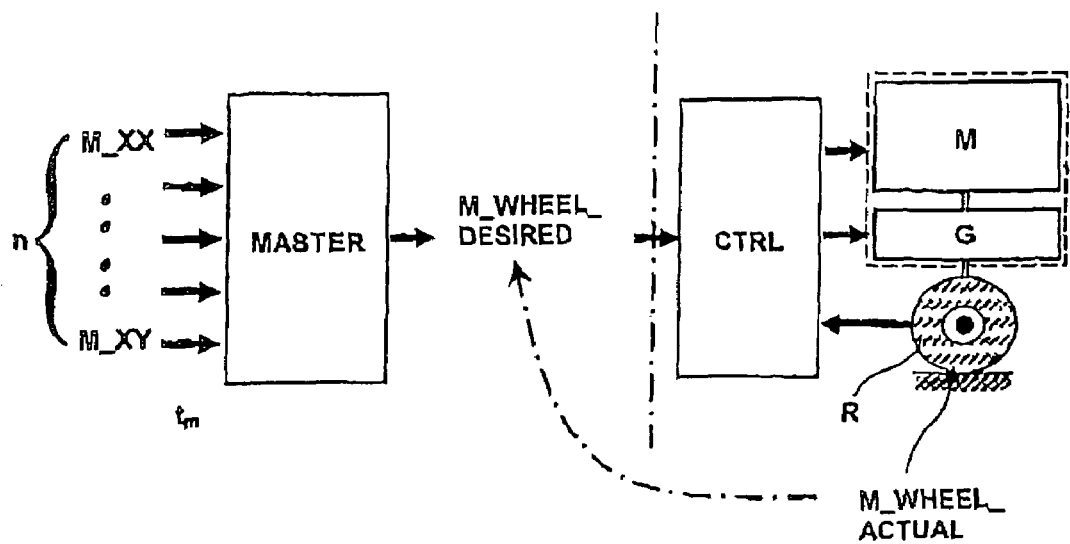
FIG. 1 is a schematic representation of an embodiment according to the invention of a basic construction of a control and regulation device with a higher-ranking function unit and a plurality of torque demanders.

FIG. 1 illustrates the basic construction of an embodiment of a control and regulation device for the electronic control of an internal-combustion-driven driving machine M and/or a transmission unit G, by which a torque definition is determined from input values of a larger number of n external demanders M_XX, . . . , M_XY. The n input values of the n external demanders M_XX, . . . , M_XY are fed into a separate higher-ranking function unit, which is called MASTER here, and are processed there to form a single demanded torque M WHEEL_DESIRED. By way of a defined interface, the demanded torque M_WHEEL DESIRED is transmitted to a controller CTRL as an actual torque actuator. The controller CTRL, in a manner known per se, then forms a regulation loop with the driving machine M and/or the transmission unit G and here, for example, a torque sensor not shown in detail on a driven vehicle wheel R of the corresponding motor vehicle.

This measure permits the evaluating of many different torque demands to be implemented to the control unit of the drive assembly or according to physical and empirical aspects and correspondingly directing a torque demand M_WHEEL_DESIRED to be made to the electronic drive control unit. Thus, only one interface has to be defined in the control of the driving machine for the torque to be set by the drive assembly, and has to be correspondingly coordinated. In a manner known to a person skilled in the art, this coordination has to meet the dynamic requirements ti of the individual torque demands. The entire coordination of n external torque demands takes place in the MASTER and is therefore finally made by way of a single demand to the engine transmission unit M, G. In order to implement a driving torque desired by the driver, a method was suggested in German Patent Document DE 199 40 703 C1 in which the torque demand is calculated back with a definition M_WHEEL_DESIRED for a wheel output torque by using models. In the illustration of FIG. 1, this regulation method is used in combination with a method according to the invention, as indicated by the broken arrow.

Figure 2:
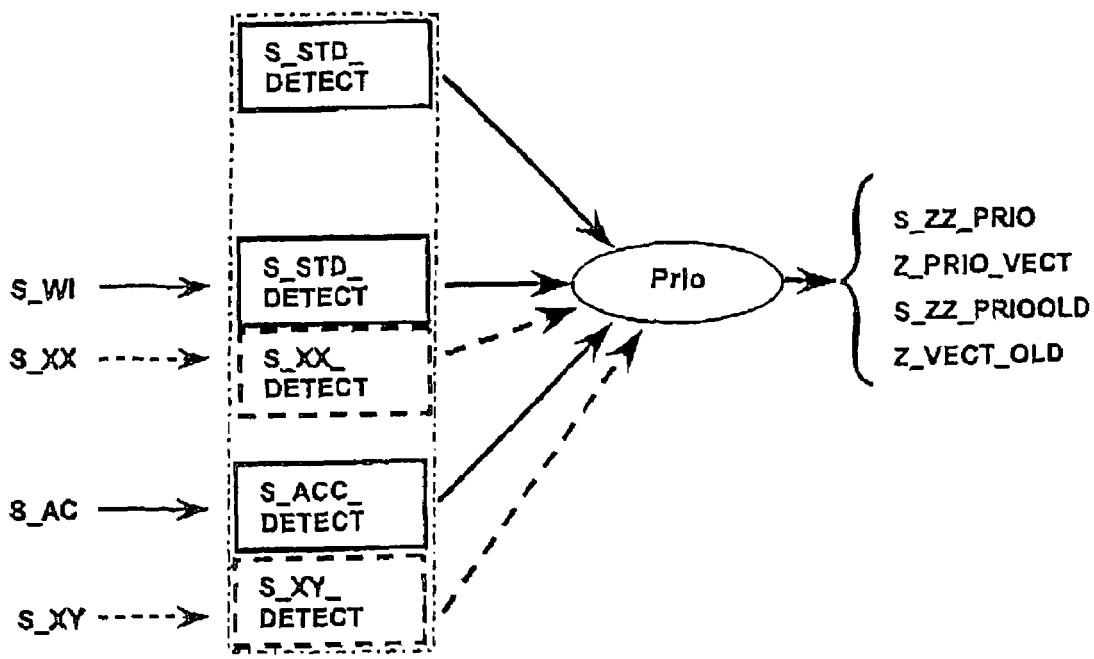
FIG. 2 is a view of a first step of a process taking place in a higher-ranking function unit.

The number of n individual demands taken into account here is advantageously composed of two different groups. A first group is formed by demands of other systems S XY inside the vehicle, such as a speed control or active cruise control ACC, a wheel slip control system ASR, or similar systems. The second group of demands is based on driving and environmental situations S_XX, such as a winter detection WI. However, both groups are treated in the same manner and are subsequently processed in the MASTER according to a method of the invention in three steps:

The first step, schematically illustrated in FIG. 2, is used for finding, from the different detected driving situations, here marked S_XX and represented by the concrete example of a winter detection S_WI, or detected torque demands of other systems S_XY, here, for example, a torque demand of a speed control or active cruise control S_ACC, that driving situation which should succeed, in order to finally define the torque demand to the drive control unit. For this purpose, so-called detected-flags of the corresponding driving situations or other systems S_XX or S_XY also demanding torques are filtered by a prioritization step PRIO such that finally a situation S_ZZ_PRIO succeeds and is correspondingly noted in a condition flag Z_PRIO_VECT. Simultaneously, a corresponding priority condition S_ZZ PRIO_OLD of the history is stored in Z_VECT_OLD in order to be able to later detect a change in the prioritization. The strategy of the prioritization will not be discussed in detail because a person skilled in the art knows how to prioritize torque demands and because the strategy of the prioritization is user-defined.

Figure 3:
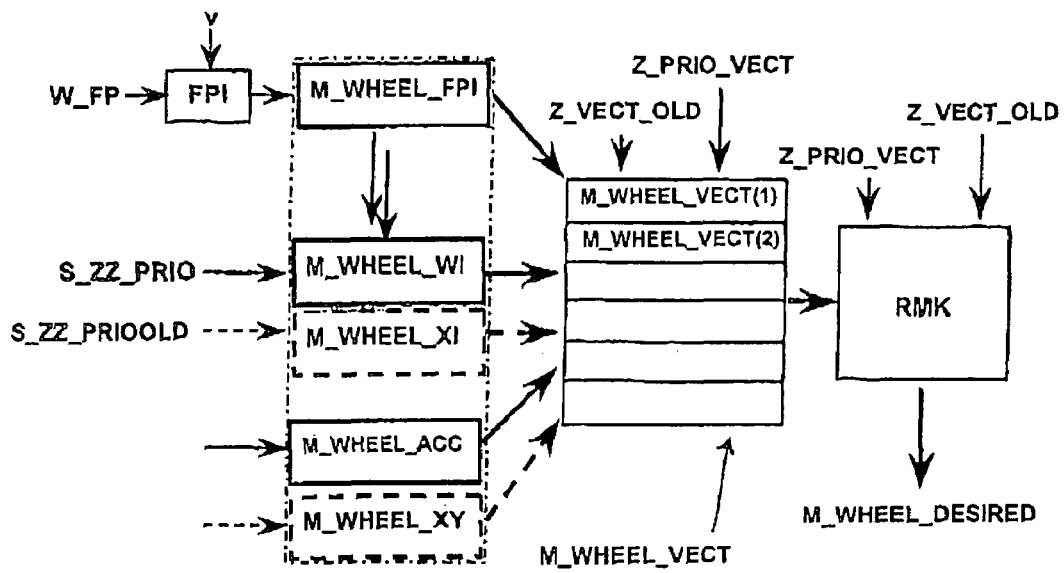
FIG. 3 is a view of a second step of the process of FIG. 2 with a calculation taking place in the higher-ranking function unit.

In the second step of the calculations taking place in the function unit MASTER, which is outlined in FIG. 3, the wheel torques M_wheel_XX, . . . , M_WHEEL_XY are processed or calculated, which are required for the implementation of the respective torque demands S_XX, . . . , S_XY. This takes place here in different fashions, in which case a differentiation is made between basically two types of calculation: In the case of a driving situation detection or environmental situation detection S_XX, as will be explained as an example in the following by way of a winter detection S_WI, a base value of the torque demand M_WHEEL_FPI originating from a torque interpretation of the accelerator pedal W FP and determined as a function of an actual vehicle speed v by a unit FPI can be manipulated or changed in a defined manner for the adaptation to wintery road conditions. This results in a wheel torque desire M_WHEEL_WI modified for a winter function. The other type of calculation occurs in the event of a torque demand S_XY of another system to the drive unit; here, outlined on the example of a detected situation and a corresponding torque demand of the ACC system S_ACC_PRIO in the form of a wheel torque desire M_WHEEL_ACC. In the event of a prioritization of this wheel torque desire M_WHEEL_ACC, a change will also be carried out on the driver's desire detected by way of the accelerator pedal interpretation, but in a form which differs from a winter detection.

Subsequently, the wheel torque desires M_WHEEL_XX, ..., M_WHEEL_XY of all n demanders are determined and, compiled in a vector M_WHEEL_VECT, are available for the firer processing. Two types of wheel torque desires to be implemented are entered into the subsequent calculation. This is, on the one hand, the wheel torque Z_PRIO_VECT, which has actually been determined by the prioritization in the process step according to FIG. 2 and is to be effective; on the other hand, it is the torque Z_VECT_OLD which pertains to the last prioritization. It continues to be required in the following in order to, among other things, be able to develop the torque transition when the priority is changed. For the further processing, the corresponding values, in each case, updated to the corresponding positions of Z PRIO_VECT or Z_VECT_OLD, are recorded in the wheel torque vector M_WHEEL_VECT, in order to be able to request them there at any time.

Figure 4A:
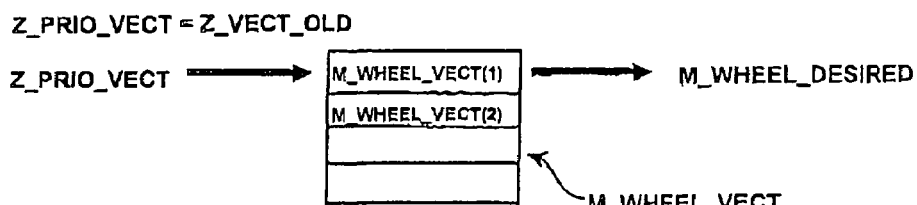
FIGS. 4a, 4b respectively are views of a flow chart for a calculation without and with a change of a priority torque definition.

In a third step, in a wheel torque node RMK, the calculation of M_WHEEL_S now takes place as the value which is finally transmitted to the drive assembly control as the desired torque to be set or to be converted. A differentiation is made here between a situation without a change and a situation with a change in the priority definition. The approach for the first-mentioned case will be explained by way of the illustration of FIG. 4a: Outside a change in the priority definition, by way of the wheel torque desire Z_PRIO_VECT, the value which characterizes the active or prioritized function, is used to look up the corresponding torque value in the wheel torque vector M_WHEEL_VECT, is copied unchanged to the value M_WHEEL_S and is emitted to the driving machine as the torque quantity to be set. If a priority change is applied, thus it is detected that Z_PRIO_VECT and Z_PRIO_VECTOLD do not coincide, a transition takes place in the torque definition.

In the following, a method of implementing such transitions will be explained by way of the illustration of FIG. 4b: When a transition is detected, by way of the new priority value Z_PRIO_VECT and the old value Z_PRIO_OLD, a time T_TRANSITION is looked up in a matrix Mx which time can be applied to the special transition and within which a transition from the old to the new torque definition should be concluded. By way of this time T_TRANSITION, a time percentage T_PERCENT elapsed at any point in time of the transition can be determined. This time percentage extends linearly with the time of the transition. By way of this percentage T_PERCENT of the already elapsed time of the transition, the torque transition percentage M_PERCENT pertaining to the percentage of the elapsed time of the transition is looked up in a characteristic curve adjustable for each transition. These characteristic curves represent an image of from 0 . . . 1 to 0 . . . 1, and their shape is arbitrarily selectable. Another method is also conceivable at this point, in the case of which, in the same manner as the time, a value is looked up in a transition matrix which characterizes a certain transition. As a result, freely applicable typical transitions can be looked up, particularly as a function of a detected and prioritized situation. In this case, in contrast to the first described method, additionally memory space can be saved.

Figure 4B:
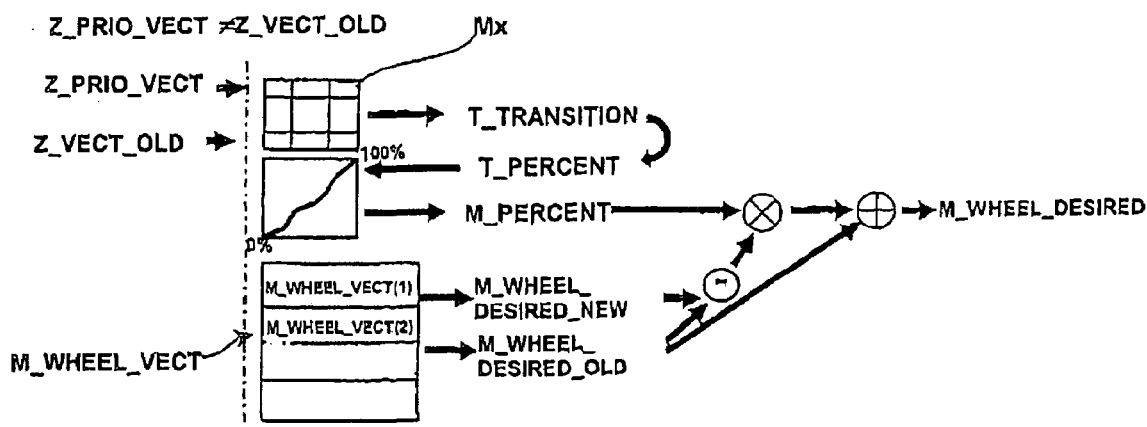

Finally, as illustrated in FIG. 4b, the calculation of M_WHEEL_S takes place by evaluation of the wheel torque difference between the old and the new condition with the percentage of the elapsed torque fraction M_PERCENT and the addition to the old value. If the time T_TRANSITION has elapsed, the transition has taken place to the current value M WHEEL_DESIRED NEW. It is indicated that the transition has ended. If a priority change is defined by the priority control during a current transition, the system is between two torque levels. The not yet reduced torque difference between the two last wheel torque demands is added to the now effective old value of the torque, in which case a current wheel torque value is used as the old value and is reduced over the new transition time. This ensures a continuous torque sequence for any possible situation. If the transition time provided for the priority change is shorter than the task time during which the functionality is computed in the control unit, the change can take place immediately according to the priority definition.

Figure 5:
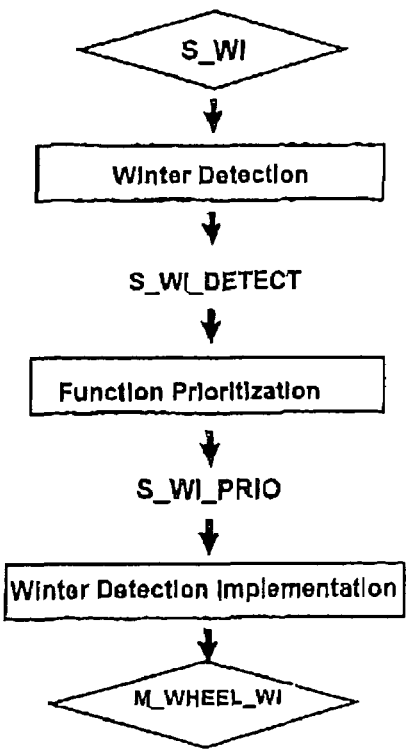
FIG. 5 is a schematic representation on the example of the calculation steps talking place for a winter functionality.

A simplified implementation for only two torque demanders is to be illustrated on the example of a winter functionality. Independently of a winter function, this functionality can be used in the same manner generally wherever the definition of an effective quantity is to be influenced in a controlled manner as a function of an external triggering signal. The influencing of a normally effective standard value can take positively as well as negatively. FIG. 5 schematically illustrates the computing steps taking place for this simplification. As a function of an external triggering signal, here S_WI as the signal of detecting a winter situation by a function on the input side, first a system-specific function detection is running which sets the switch S_WI_DETECT. A function prioritization decides whether this situation has priority over concurring situations. In the simplest case of two possible demanders, this may be a simple decision or query according to the diagram "if (condition), then (Case A) else (Case B)" which is fixedly coded. When it comes to the implementation of this function, an effective wheel torque M_WHEEL_WI is computed by the targeted influencing of the standard signal.

Figure 6:
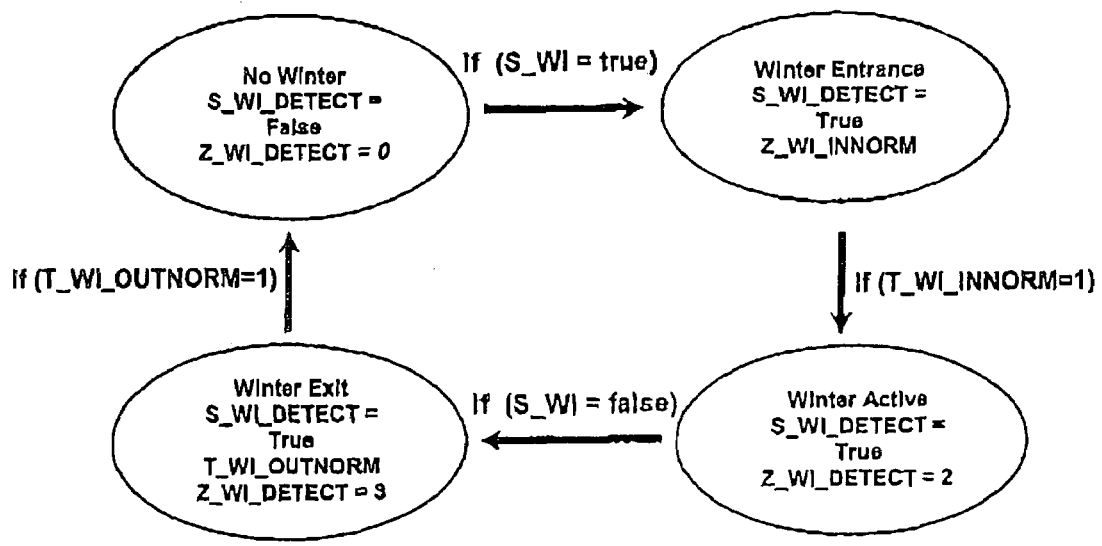
FIG. 6 is a schematic representation of a system-specific winter detection.

In the following, the steps of the winter detection and the implementation will be explained in greater detail, the system-specific winter detection being schematically illustrated in FIG. 6. The processing of the winter detection takes place in the form of an automatic condition machine which has a simple transition matrix. The transition from a condition can only take place into a possible sequential condition. The conditions are announced in Z_WI_DETECT. No winter (Z_WI_DETECT=0)→winter entrance (Z_WI DETECT=1)→winter active (Z_WI_DETECT=2)→winter exit (Z_WI_DETECT=3)→no winter (Z_WI_DETECT=0) →etc. In this embodiment, each condition in a constantly repeating loop has to be passed; a winter entrance cannot be interrupted. An exit can only start in the "winter active"

condition. During the "winter entrance" and "winter exit conditions", it is computed what percentage of the applicable entrance and exit time respectively has elapsed. A respective result is correspondingly emitted as T_WI_IN-NORM and T_WI_OUTNORM.

Figure 7:
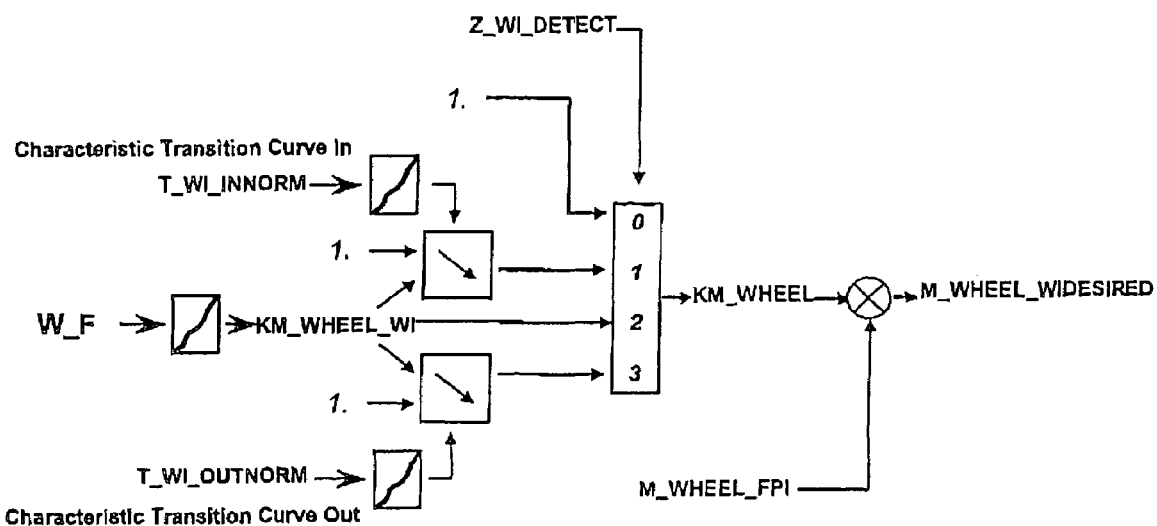
FIG. 7 is a schematic view of a time sequence when the winter detection is implemented

The implementation of the winter detection takes place as illustrated in FIG. 7. The prioritization has already been concluded and the corresponding functionality can be processed; that is, the standard torque M_WHEEL_FPI, which represents a torque interpretation of the driver's desire W_FP, is controlled by way of the factor KM_WHEEL. Corresponding to a respective position of the accelerator pedal or, in the general case, of an arbitrary condition, an accelerator-pedal-dependent reduction factor, a factor KM_WHEEL WI, is looked up in a characteristic curve. By way of the accelerator-pedal-dependent reduction factor, the standard definition M_WHEEL_FPI is controlled when the condition is detected, illustrated by Z_WI_DETECT. In the condition "no winter active" (Z_WI DETECT=0), the standard torque (M_WHEEL_FPI) is evaluated with the factor 1, thus, allowed to pass uninfluenced. In the condition "winter active" (Z_WI_DETECT=2), the evaluation takes place by the factor KMWHEEL_WI. In the two transition conditions "winter entrance" with Z_WI_DETECT=1 and "winter exit" with Z_WI_detect=3, the computation of an evaluation factor KM_WHEEL in each case takes place according to defined transition functions CHARACTERISTIC TRANSITION CURVE IN and CHARACTERISTIC TRANSITION CURVE OUT. These two characteristic curves determine in a freely applicable manner which percentage of the transition has already taken place after the corresponding time percentage. These are constant characteristic curves which image the range 0 . . . 1 on 0 . . . 1. The result quantity of an xth computation (M_WHEEL_WIDESIRED), can now be emitted to the unit to be set instead of a standard value or of a concrete definition value and finally be converted for the adaptation of a driver's desire M_WHEEL_FPI to a wintery road situation. In a modified manner, a slip control can also be formed therefrom, for example, for coefficients of friction between wheel tires and different road conditions in the summer or in the rain, etc.

This can ensure a reliable function of a torque regulation in the case of a plurality of demanders and therefore a perfect engine function with reduced expenditures for design and planning in comparison to known methods and systems. In comparison to known methods, a method according to the invention and a corresponding system have considerable advantages with respect to their flexibility in the adaptation to an almost arbitrarily large number of demanders and correspondingly many transitions between demanded torques. Thus, an arbitrarily adjustable time can be adjusted for the duration of n transitions x(x≦n-1)→y(y≦n-1) of a transition. With this possibility, fast transitions can in each case be detected and optimally be taken into account with respect to safety aspects and slower transitions for creating an improved driving comfort. Furthermore, a characteristic transition curve for the transition of a torque pertaining to x to a torque pertaining to a demand y can be freely defined. As a result, a selection becomes possible of transition curves corresponding to a respective driving situation between different torque demands, which can be adjusted in a balanced manner with respect to safety, comfort and also economy.

By means of the inventions, the prioritization so far illustrated in the timing gear is corrected. In addition, the torque demand to the driving machine can be made uniform and can be standardized. As a result, the development of a respective control for an entire engine transmission unit can be accelerated at a high qualitative level. By reducing the interfaces on the control unit for the engine transmission unit, the complexity of a coordination in the development can again be reliably mastered, so that a slight consideration of additional torque demands on the drive assembly control is permitted. This can advantageously take place without a change of software in the control of the drive assembly, which accelerates the development process and makes the complexity manageable at a required high quality level.

The above-described embodiment shows an operating cycle for the general usability of this functionality.

The strict processing diagram can be applied to many areas, even if only two demanders are involved which are mutually exclusive. The processing diagram illustrated by means of the winter function can be used wherever a dependence on an external triggering signal in a control or regulation causes a signal influencing and, in addition, an essentially free applicability is required.

Within the scope of the description of the present invention, the following designations and abbreviations were used:

| | |
|---|---|
| CTRL | electronic controller/torque regulator |
| G | transmission unit |
| KM_WHEEL | factor |
| KM_WHEEL_WI | accelerator-dependent reduction factor |
| M | driving machine/engine |
| MASTER | function unit according to the invention |
| M_WHEEL_FPI | base value of the torque demand |
| M_WHEEL_WI | wheel torque desire modified by a winter function |
| M_WHEEL_ACC | torque desire modified by prioritized demand |
| M_PERCENT | percentage of elapsed torque fraction |
| M_WHEEL_VECT | wheel torque vector |
| M_WHEEL_DESIRED | current desired value (definition) of the wheel output torque |
| M_WHEEL_DESIRED NEW | new desired value |
| M_WHEEL_DESIRED OLD | old desired value |
| M_WHEEL_FPI | standard torque (definition according to accelerator pedal interpretation) |
| M_WHEEL_WI | effective wheel torque in the case of winter function |
| Mx | matrix |
| n | number of individual demands |
| R | vehicle wheel |
| RMK | wheel torque node |
| S_XY | external torque demand of other systems |
| S_XX | demands from driving and environmental situations |
| S_ACC | torque demand ACC |
| S_WI | winter detection |
| S_WI_DETECT | switch for a winter situation detected by the master |
| S_ZZ_PRIO | successful situation |
| S_ZZ_PRIO OLD | old value of a previously successful situation |
| S_WI_PRIO | winter function as successful situation |
| S_ACC_PRIO | detected and prioritized torque demand of the ACC |
| tm | dynamics of a torque demand |
| T_PERCENT | percentage of elapsed time fraction |
| T_TRANSITION | time applicable to the special transition |
| T_WI_INNORM | elapsed percent of the applicable entrance time |
| T_WI_OUTNORM | elapsed percent of the applicable exit time |
| W_FP | accelerator pedal interpretation, driver's desire |
| Z_PRIO_VECT | condition flag, position in M_WHEEL_VECT |
| Z_VECT_OLD | priority condition of history, position in M_WHEEL_VECT |
| Z_WI_DETECT | detected condition in the case of winter function |

The invention claimed is:

1. A method for regulating and/or controlling an engine-transmission unit in a motor vehicle, comprising:
   in a function unit connected to a controller, prioritizing torque demands from torque demands generated by a plurality of demanders to obtain an only torque value;
   storing the only torque value as a current successful situation and retaining the torque value for use in a future process as a previous successful situation;
   processing the torque value of the current successful situation as well as the torque value of a previous successful situation to comparable torque values in each case required for the implementation of the demands;
   in the event of a priority change when the current successful situation is different from the previous successful situation, changing a desired torque demand at driving wheels of the motor vehicle from the torque value of the previous successful situation to the torque value of the current successful situation;
   sending the desired torque demand to an electronic controller; and
   carrying out the desired torque demand by controlling at least one of engine parameters and a ratio of a transmission unit.

2. The method according to claim 1, comprising, in the function unit,
   considering internal torque demands of other systems inside the vehicle and external torque demands which result from different environmental and driving situations;
   converting the external and internal torque demands into wheel torques.

3. The method according to claim 2, comprising, in a preparatory manner, detecting all internal and/or external demanders and torque demands and determining corresponding wheel torque demands.

4. The method according to claim 3, comprising storing the wheel torque demands.

5. The method according to claim 4, comprising prioritizing the torque demands such that finally only one situation is prioritized.

6. The method according to claim 5, comprising noting the torque demand of a prioritized situation with a condition flag.

7. The method according to claim 6, comprising storing a torque demand of an old prioritized situation noted by an another condition flag.

8. The method according to claim 7, comprising storing the wheel torque demands in a vector or a linear memory.

9. The method according to claim 8, comprising defining the condition flag for the torque demand of a prioritized situation and the condition flag for the torque demand of an old prioritized situation as pointers at corresponding positions in the memory.

10. The method according to claim 9, comprising, differentiating between a priority change and a progression of the regulating operation without any priority change.

11. The method according to claim 10, further comprising, in the event of a priority change, creating a constant transition in the desired torque demand, which is determined as a function of a time, the difference between the old and new desired torque demands, and/or the new desired torque demand or a detected and prioritized situation.

12. The method according to claim 11, comprising, in the event of a transition, looking up and adjusting a time applicable to the transition while defining values from a matrix.

13. The method according to claim 12, comprising selecting the shape of a transition curve as a function of the detected and prioritized situation or torque demand.

14. A system for regulating and/or controlling an engine-transmission unit in a motor vehicle, comprising:
   the controller having an input side;
   the function unit connected to the input side of the controller,
      wherein the functional unit is programmed to perform the steps of
      prioritizing torque demands from torque demands generated by a plurality of demanders to obtain an only torque value:
      storing the only torque value as a current successful situation and retaining the torque value for use in a future process as a previous successful situation;
      processing the torque value of the current successful situation as well as the torque value of a previous successful situation to comparable torque values in each case required for the implementation of the demands:
      in the event of a priority change when the current successful situation is different from the previous successful situation, changing a desired torque demand at driving wheels of the motor vehicle from the torque value of the previous successful situation to the torque value of the current successful situation; and
      sending the desired torque demand to the controller;
   wherein the controller is programmed to carry out the desired torque demand by controlling at least one of engine parameters and a ratio of a transmission unit.

15. The system according to claim 14, further comprising a memory that is constructed to store the torque demands of the demanders.

16. The system according to claim 15, wherein the functional unit also prioritizes and weighs torque demands related to driving situations.

17. The system according to claim 16, comprising at least one of a time and a corresponding curve shape, which are used for a transition from one prioritized desired torque demand to another prioritized desired torque demand.

* * * * *